United States Patent [19]

Browning et al.

[11] 4,189,210
[45] Feb. 19, 1980

[54] VISUAL EFFECT SYSTEM

[75] Inventors: Michael R. Browning, Balnarring; Volkert E. Mol, Merricks, both of Australia

[73] Assignee: Phillip Andrew Adams, Victoria, Australia

[21] Appl. No.: 916,860

[22] Filed: Jun. 19, 1978

[30] Foreign Application Priority Data

Jun. 27, 1977 [AU] Australia .............................. PD0575

[51] Int. Cl.$^2$ ............................................. G02B 27/22
[52] U.S. Cl. .................................................... 350/132
[58] Field of Search ................... 350/132, 144; 352/86; 353/10; 354/112

[56] References Cited

U.S. PATENT DOCUMENTS

| 1,843,663 | 2/1932 | Cregier | 353/10 |
| 3,663,085 | 5/1972 | Davis | 350/132 |
| 3,712,199 | 1/1973 | Songer, Jr. | 350/132 |

Primary Examiner—John K. Corbin
Assistant Examiner—Scott J. Sugarman

Attorney, Agent, or Firm—Stevens, Davis, Miller & Mosher

[57] ABSTRACT

Apparatus for producing a three-dimensional effect from a two dimensional image carrier having a focussed area containing principal subject matter and a defocussed area containing incidental subject matter. The apparatus includes a camera lens system, an optical device mounted within said lens system and a stereoscopic viewer. The optical device comprises a module which includes a pair of colored filter elements of different wavelength passbands, the filter elements being displaced laterally on opposite sides of an axis of said module, the module being arranged to cause an aberration to be formed on at least some of the incidental subject matter in the defocussed area but not affect the principal subject matter in the focussed area. The stereoscopic viewer comprises a pair of colored filter elements one for each eye, these filter elements having wavelength passbands which are balanced with respect to the wavelength passbands of the module filter elements so that a respective wavelength passband of said module filter elements is blocked by each viewer filter element but at the same time permitting a quantity of the full color spectrum to pass.

7 Claims, 4 Drawing Figures

U.S. Patent  Feb. 19, 1980  Sheet 2 of 2  4,189,210
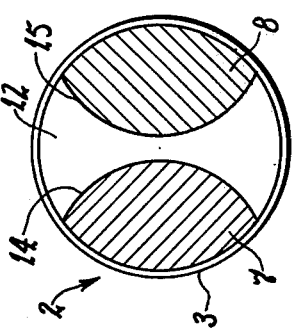
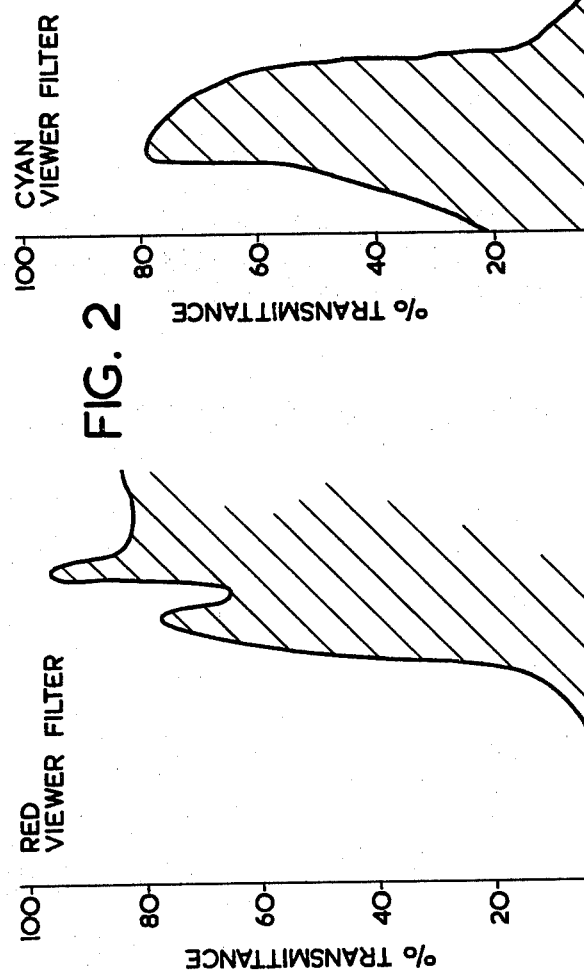

VISUAL EFFECT SYSTEM

The present invention relates generally to systems for producing a three dimensional effect from a two-dimensional or planar object such as a film, photograph or the like. In a particular application, the invention is concerned with producing a three dimensional effect from a colour photographic film suitable for either still photographs, slides or cinematographs. The system is also suitable for producing a three dimensional effect on television either on television film for subsequent scanning into a video signal or derived directly through the television tube.

Generally, three dimensional reproductions are produced by techniques utilizing stereoscopic effect of retinal disparity. This binocular stereoscopic effect is generally produced by taking two almost identical photographs of the scene and transposing these scenes on top and slightly offset to separate portions of one conventional frame, or to separate frames on separate materials. When viewed through a suitable stereoscopic viewer, the two images combine to form a three dimensional reproduction of the original scene.

Prior to the present invention stereoscopic projection onto a screen has been generally effected by projecting a matched pair of stereo-films, or by a single beam-splitter twin lens projector projecting stereo-images from a single film; in both cases, projecting through polarizing filters or coloured filters. The viewer wears corresponding coloured or polarizing spectacles having viewing filters for the left and right eyes oriented with their planes or polarization parallel to the corresponding left and right hand projection filters or to the respective coloures. Thus, each eye views only that picture projected through the corresponding lens of the projector and the viewer responds to the two impressions to create a sensation of depth.

Conventional systems of the type described above suffer from several disadvantages. Firstly, special and complex cameras and laboratory techniques are necessary to produce the basic images. Furthermore, two projectors and two films or one projector with a beam splitter and two images on one film are required for projection of the images. The equipment used is generally expensive and requires a high degree of skill to set up. Finally, the projected image cannot be satisfactorily viewed without a stereoscopic viewer owing to the presence of a well defined double image.

One particular form of apparatus which has attempted to allocate some of the aforementioned disadvantages is disclosed in U.S. Pat. No. 3,712,199. In this patent there is disclosed apparatus for producing a three dimensional colour picture which is fully compatible when viewed unaided in two dimensions. The apparatus essentially comprises a filter which divides the lens aperture stop into left and right halves and lets mutually exclusive portions of the spectrum pass through each half. When viewed with glasses consisting of identical filters over the corresponding eye a pshychophysiological illusion of three dimension is created.

The above system suffers however from several disadvantages. For example when viewed through the glasses the reproduction is seriously deficient in colour. Furthermore there can be a tendency for sidewash to occur at the edges of the reproduction. A further disadvantage is that it is not readily adaptable for a variety of situations.

It is therefore an object of the present invention to provide a system which alleviates the aforementioned disadvantages.

According to the present invention there is provided apparatus for producing a three-dimensional effect from a two dimensional image carrier having a focussed area containing principal subject matter and a defocussed area containing incidental subject matter; said apparatus including a camera lens system, an optical device mounted within said lens system, said optical device comprising a module which includes a pair of coloured filter elements of different wavelength passbands, said filter elements being displaced laterally on opposite sides of an axis of said module, said module being arranged to cause an aberration to be formed on at least some of the incidental subject matter in the defocussed area but not affect the principal subject matter in the focussed area; and a stereoscopic viewer comprising a pair of coloured filter elements one for each eye, said filter elements of said viewer having wavelength passbands which are balanced with respect to the wavelength passbands of said module filter elements so that a respective wavelength passband of said module filter elements is blocked by each viewer filter element but at the same time permitting a quantity of the full colour spectrum to pass.

In one arrangement the module filter elements select wavelengths at opposite ends of the visible spectrum. Preferably filter module is circular and the filter elements are displaced laterally on opposite sides of a diametral axis of the module. A natural light passage may be provided between said filter elements. In this particular form of the invention the filter elements include arcuate inner peripheral edges those inner peripheral edges being closest together at the center of said module.

Preferably the module is mounted as near as possible to the nodal point of said lens system. Desirably the viewer filter elements have wavelength passbands which extend more toward the central region of the visible spectrum relative to the wavelength passbands for the module filter elements.

Example embodiments of the invention will hereinafter be described with reference to the accompanying drawings in which:

FIG. 2 are representations of absorption curves indicating the characteristics of colour filter elements suitable for use in the viewer in conjunction with the module filter elements shown in FIG. 1;

FIG. 3 is a schematic view of a typical lens system incorporating a module according to the invention; and FIG. 4 is a schematic view of a filter module in accordance with the invention.

As mentioned earlier the apparatus incorporating the optical device of the invention creates an image having partial aberration only in the incidental subject matter area. That is, an aberration is deliberately created only in that part of the image not normally containing the principal item or items of the image. For example, in a scene comprising a principal item and incidental foreground and/or background material, the aberration will be created in all or part of that incidental material such that the principal item retains its clarity under both stereoscopic and normal or free modes of viewing. In the case of photographic images, it is generally preferred to produce the aberration outside of the depth of field (i.e., field of maximum resolution) of the lens used in creating the image.

It has been found that an aberration in the incidental foreground and/or background of an image permits the creation of a three dimensional effect when the image is viewed through a suitable stereoscopic viewer, but allows a satisfactory degree of clarity to remain in the central theme such that an acceptable two dimensional appearance is obtained without the stereoscopic viewer. That is, in the latter case the aforementioned aberrations are not readily apparent.

The invention has particular application in connection with colour photographic and television reproductions, and as a matter of convenience it will hereinafter be described with reference to that example application.

Figure 1:
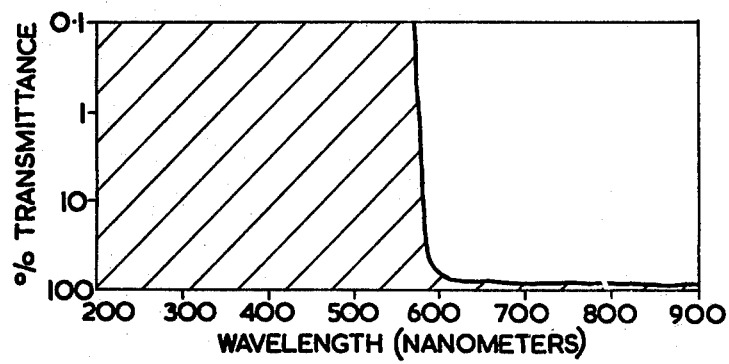
FIG. 1 are representations of absorption curves indicating the characteristics of colour filter elements suitable for use in the filter module.
Figure 1:
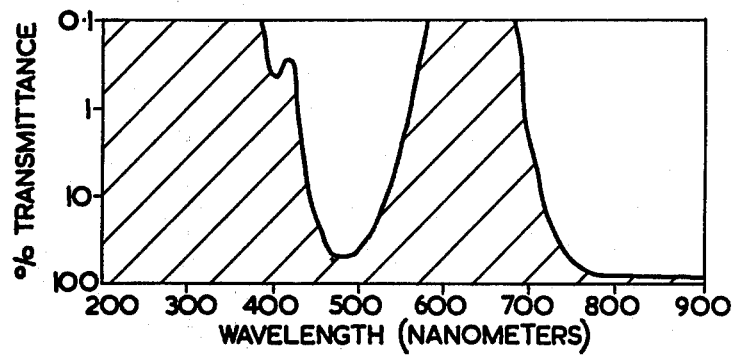

As shown in the drawings the apparatus which is generally indicated at 1 includes an optical device 2, in the form of a filter module 3 which is adapted to be mounted in the lens system 5 of a camera. In the subject method, a limited aberration is created in the image produced due to controlled defocus. The camera and lens system can be of any normal type, although the characteristics of the module may have to be varied for different cameras and lens systems, and can be installed during lens manufacture. The lens system shown in FIG. 3 is of a typical Tessar type. The module 3 includes a pair of coloured filter elements, 7 and 8 each exhibiting complementary wavelength passbands and each displaced laterally to one side of the diametrical or longitudinal axis of the module 3, which axis is preferably coincident with the axis of the camera lens system. Desirably, the two colours used in the filter elements select wavelengths at opposite ends of the visible spectrum, such as for example, the colours red and cyan and more preferably, with the properties shown in the attached FIG. 1. It is further desirable that the filters exhibit such density that the image provides well-balanced colour condition.

A natural light passage 12 may be provided between the two filter elements 7 and 8. This may be accomplished by leaving a portion of neutral or clear material (or a space) interposed between the two coloured filter elements. The area and shape of the colour filters and the neutral portion can be varied for specific conditions as will become apparent hereinafter.

In the preferred arrangement, the module 3 is substantially circular in transverse cross-section, with the filter elements 7 and 8 spaced apart on opposite sides of the centre. The inner peripheral edges 14 and 15 of each filter element is substantially symmetrically arcuate in shape such that the two filter elements are closest together at the centre or axis of the module, and progressively spread apart toward the upper edges of the module to vary the relative area subtended by the filters for reasons which will hereinafter become apparent.

In use, the filter module 3, is mounted on or in the lens system 5 of the camera. To avoid vignetting it is desirable that the filter elements of the module be positioned as near as practicable to the iris or aperture plane 17 of the lens system 3.

The effect created by the module 3, will hereinafter be described with reference to FIG. 3 of the drawings.

Light from the subjects in the scene being photographed is transmitted through the lens system 5 and module 3 onto the film 20 (or television tube). The two colour filter elements 7 and 8 in the module 3 at least partially block particular colours from passing through that portion of the module; i.e., for example, where red and cyan colours are used the red filter transmits redish colours therethrough but progressively blocks other colours towards blue end of the spectrum with substantially all blue colours being blocked. The cyan filter acts in the opposite way by blocking progressively colours towards the red end of the spectrum. The principal subject image (that is, the subject image which is sharply in focus on the focal plane) indicated by numeral 22 in FIG. 3, is not effected by the filter elements of the module since the light from the respective filter elements of the module becomes coincident at the focal plane so as to provide a true coloured image.

The incidental foreground (23') and/or background subject images (24') are not, however, in focus and the images are blurred. Accordingly, the light from the subject passing through the two filter elements is not coincident at the focal plane of the camera lens system. The reasons for this is that light, for example, from the foreground image has a point of focus behind the lens focal plane and for background images the light rays therefrom are diverging from its point of focus in front of the lens focal plane before striking that focal plane. This results in a band of colour in each side of the subject image similar to the colour of one of the filter elements in the module. These bands of colour will hereinafter be referred to as "colour fringes".

When viewed with the naked eye (free viewing), a photograph or slide reproduced using the aforementioned system appears two dimensional and the colour finging becomes unapparent to the observer. That is, although close scrutiny of the photograph will reveal the colour fringes, they are not normally noticeable within the context of the defocussed portion of the total image.

In different lens systems however, the density of the colour fringing will vary. As such it is desirable to adjust the density of the fringing to a level where it will create a three dimensional effect when the photographs is viewed through a suitable viewer while at the same time be maintained at level of density which is substantially not apparent when the reproduction is viewed as a whole.

To adjust the "fringe density", the area of the natural light passageway of the module is adjusted. If it is desired that the fringe density be increased, the natural light passage of the module is reduced and vice versa. The symmetric arcuate shape of the filters provides a relatively constant proportion of filter area as the (round) iris is opened and closed for f-settings. Furthermore, the sidewash which may appear at the edges of the reproduction can be adjusted by modifying the radius of curvature of the filter elements.

For viewing the reproduction with a three dimensional effect, the system further includes a stereoscopic viewer which includes a pair of filter elements one for each eye. The filter elements in the viewer are two colours, each of which will block a complementary fringe colour while at the same time permitting a quantity of the full colour spectrum of the reproduction to pass.

In a preferred arrangement the two filters are red and cyan having respective wavelength passbands which extend slightly more towards the centre of the visible spectrum relative to the respective red and cyan colours used in the module filter elements. In the preferred example of module filters given earlier the properties of the colours of the viewer filters are shown in FIG. 2.

The reason for using different wavelengths for the viewer filter elements is that if such mutually exclusive colour filter elements as in the module (FIG. 1) were used in both the module and the viewer, the reproduction would appear seriously deficient in colour. Thus, it is desirable to permit the transmittance of a proportion of the full colour spectrum of the reproduction through viewing filter elements which exhibit somewhat more relaxed mutual colour blockage.

The filter elements in the viewer co-operate with the module filter elements to create a stereoscopic effect in a manner as will be hereinafter described.

When the reproduction is viewed through the viewer, one of the filter elements positioned over one eye blocks to that eye one of the colour fringes on the foreground and/or background images in the reproduction. The other viewer filter element blocks to the other eye the other colour fringe. Accordingly, each eye views a different image, which when superimposed in the brain, cause a three dimensional effect. Since, a quantity of true colour is transmitted through the viewer filter elements the reproduction will be seen in colour.

It will be readily apparent that the system of the present invention exhibits many advantages over conventional systems. For example, a normal camera and normal laboratory techniques can be used and further only one projector and one film are required.

A particular advantage of the present system is that it can be used for colour television owing to its use of normal camera and projector techniques. Conventional systems are not adaptable for television unless enormously expensive equipment is used. In the case of direct television, the module can be fitted into the lens of a television camera.

It can be seen from the foregoing that the apparatus of the invention provides a compatible system; that is, one which when viewed freely (without viewing aids), forms a satisfactory conventional 2-dimensional colour image, and when viewed through appropriately coloured glasses, forms a stereoscopic colour image. The above characteristics are achieved with a single "taking" objective lens having a single optical aperture, exposing a single image frame; photographic or television. The effect can be produced during a single exposure, requiring only conventional settings of f-stop and focus adjustments. The apparatus provides as a multiplexed group of at least 2 images in perfect registry in their focused portions, providing the appearance of a conventional image acquired through a lens having a low f-stop setting, which normally renders defocus in regions fore and aft of the sharply focused subject matter. By encoding of the disparate portions of the stereo pair in the defocused regions, avoiding the distracting sharp "double image" associated with a conventional "stereopair" when viewed freely, which, because of its disparate nature, must be imperfectly registered over some portions of the image format.

Furthermore, the apparatus suffers no keystone distortion of the multiplexed images. The apparatus has the advantage of use with a straightforward modification to the conventional "taking lens", and requiring no auxiliary attachments, nor critical alignment procedures, requiring no departure from conventional photographic colour film processing or television camera broadcast, receiving signal or display procedures.

In cinema the effect is produced with a single film projector requiring no modification nor attachment to that employed for conventional 2-dimensional colour cinema, and allowing routine operation by the projectionist.

With particular reference to the prior art patent 3,712,199 it should be noted that in the present invention the filter transmission characteristics are not mutually exclusive so as to provide a more compatible image when viewed without the stereoscopic viewer. Furthermore the difference in filter transmission characteristics between the viewer filter elements and the module filter elements so as to enable a quantity of the full colour spectrum to pass provides a far greater colour quality than the system disclosed in the aforementioned United States patent.

The United States patent also describes and emphasises the use of opaque segments to enhance the properties of that system. The present invention on the other hand provides a clear area in the module which is shaped so as to achieve a relatively uniform ratio of clear area to filtered area as a (nominally) round iris is actuated (larger and smaller diameter) to adjust f-setting. This provides a more uniform "filter factor"—approaching a constant—to compensate simply for filter loss throughout all f-settings. This improves the practical iris/exposure settins—especially during rapidly changing scene conditions.

Finally, it is to be understood that various alterations, modifications and/or additions may be introduced into the constructions and arrangements of parts previously described without departing from the spirit or ambit of the invention as defined by the following claims.

Having now described our invention, what we claim as new and desire to secure by Letters Patent is:

1. Apparatus for producing a three-dimensional effect from a two dimensional image carrier having a focussed area containing principal subject matter and a defocussed area containing incidental subject matter; said apparatus including a camera lens system, an optical device mounted within said lens system, said optical device comprising a module which includes a pair of coloured filter elements of different wavelength passbands, said filter elements being displaced laterally on opposite sides of an axis of said module, said module including a full colour spectrum passage between said filter elements said module being arranged to cause an aberration to be formed on at least some of the incidental subject matter in the defocussed area but not affect the principal subject matter in the focussed area; and a stereoscopic viewer comprising a pair of coloured filter elements one for each eye, said filter elements of said viewer having wavelength passbands which are balanced with respect to the wavelength passbands of said module filter elements so that a respective wavelength passband of said module filter elements is blocked by each viewer filter element but at the same time permitting a quantity of the full colour spectrum to pass.

2. According to claim 1, wherein said module filter elements select wavelengths at opposite ends of the visible spectrum.

3. Apparatus according to claim 1 wherein said filter module is circular and said filter elements are displaced laterally on opposite sides of a diametral axis of said module.

4. Apparatus according to claim 3 in which a natural light passage is provided between said filter elements.

5. Apparatus according to claim 4 wherein, said filter elements include arcuate inner peripheral edges said inner peripheral edges being closest together at the centre of said module.

6. Apparatus according to claim 5 wherein said module is mounted as near as possible to the nodal point of said lens system.

7. Apparatus according to claim 6 wherein said viewer filter elements have wavelength passbands which extend more toward the cental region of the visible spectrum relative to the wavelength passbands for said module filter elements.

* * * * *